(12) United States Patent
Gaboury et al.

(10) Patent No.: US 8,085,563 B2
(45) Date of Patent: Dec. 27, 2011

(54) PROTECTION AND CLAMP CIRCUIT FOR POWER FACTOR CORRECTION CONTROLLER

(75) Inventors: Michael J. Gaboury, Burnsville, MN (US); Gregory J. Rausch, Minnetonka, MN (US)

(73) Assignee: Polar Semiconductor, Inc., Bloomington, MN (US)

( * ) Notice: Subject to any disclaimer, the term of this patent is extended or adjusted under 35 U.S.C. 154(b) by 492 days.

(21) Appl. No.: 12/378,267

(22) Filed: Feb. 12, 2009

(65) Prior Publication Data

US 2010/0202169 A1 Aug. 12, 2010

(51) Int. Cl.
*H02M 7/04* (2006.01)
(52) U.S. Cl. ............ 363/89; 363/80; 323/222; 323/285
(58) Field of Classification Search .............. 363/16–17, 363/44–46, 56.03, 56.11, 65, 74, 80, 81, 363/89, 97, 98, 127; 323/210, 211, 222, 323/224, 282, 266, 284, 285; 361/92, 100, 361/101, 91.1, 93.03
See application file for complete search history.

(56) References Cited

U.S. PATENT DOCUMENTS

| | | | |
|---|---|---|---|
| 5,006,975 A * | 4/1991 | Neufeld | 363/80 |
| 5,134,355 A * | 7/1992 | Hastings | 323/211 |
| 5,367,247 A * | 11/1994 | Blocher et al. | 323/222 |
| 5,572,416 A * | 11/1996 | Jacobs et al. | 363/89 |
| 6,160,385 A * | 12/2000 | Feldtkeller | 323/222 |
| 6,465,990 B2 | 10/2002 | Acatrinei et al. | |
| 7,042,743 B2 * | 5/2006 | Pidutti et al. | 363/89 |
| 7,135,845 B2 | 11/2006 | Zverev et al. | |
| 7,151,360 B2 | 12/2006 | Kim et al. | |
| 7,295,452 B1 | 11/2007 | Liu | |
| 7,323,851 B2 | 1/2008 | Markowski | |

(Continued)

OTHER PUBLICATIONS

BiCMOS Power Factor Preregulator Unitrode Products from Texas Instruments Production Data for Models UCC2817, UCC2818, UCC3817 and UCC3818, SLUS395A Feb. 2000 (Rev. Apr. 2000), Copyright 2000, Texas Instruments Incorporated, Houston, TX.

(Continued)

*Primary Examiner* — Rajnikant Patel
(74) *Attorney, Agent, or Firm* — Kinney & Lange, P.A.

(57) ABSTRACT

A controller generates a drive signal for a converter circuit that includes an active component (i.e., transistor) that is selectively controlled to convert a rectified input to direct current (DC) output. The controller employs an outer feedback loop (based on monitored output voltage of the converter circuit), an inner feedback loop (based on monitored AC input current drawn by the converter circuit), and a pulse width modulator (PWM) to generate the drive signals necessary to generate the desired DC output voltage and to provide power factor correction to the converter circuit. In particular, the inner feedback loop includes an amplifier and a fault protection and clamp circuit. The amplifier has a first input connected to receive a feedback signal representing the monitored AC input current, a second input, and an output that provides a current feedback signal to the PWM. The fault protection and clamp circuit is connected to monitor the voltage at the second input of the PWM and to detect fault conditions associated with the converter circuit, wherein in response to an over-voltage condition at the second input or a detected fault condition the fault protection and claim circuit clamps the current feedback signal provided to the second input of the PWM to a reference value and provides the reference value in feedback to either the first or second input of the amplifier.

18 Claims, 8 Drawing Sheets

U.S. PATENT DOCUMENTS 7,440,297 B2 * 10/2008 Adragna et al. ............... 363/50
2007/0040533 A1 2/2007 Krein

OTHER PUBLICATIONS

BiCMOS Power Factor Preregulator Unitrode Products from Texas Instruments Production Data for Models UCC2817, UCC2818, UCC3817 and UCC 3818, SLUS395I Feb. 2000 (Rev. Feb. 2006), Copyright 2006, Texas Instruments Incorporated, Houston, TX.

Transition Mode PFC Controller Product Guide for Models UCC28050, UCC28051, UCC38050 and UCC38051, SLUS515E Sep. 2002 (Rev. Jun. 2007), Copyright 2002, Texas Instruments Incorporated, Houston, TX.

Franck, W. ICE1PCS01—Technical Description AN-PFC-ICE1PCS01-1; Application Note, V1.2, Oct. 29, 2003, Power Management & Supply, Infineon Technologies, Munich, Germany.

Hancock, J.M. Simplifying Power Factor Correction in SMPS, Power Electronics Technology, Oct. 2004, pp. 26-35.

"Optimize PFC Preregulator Designs", from http://www.printthis.clickability.com/pt/cpt?action=cpt &title=Optimize+PFC+Preregulator . . . , visited on Nov. 11, 2008, reprinted Feb. 12, 2009 (6 pages).

* cited by examiner

PROTECTION AND CLAMP CIRCUIT FOR POWER FACTOR CORRECTION CONTROLLER

BACKGROUND

The present invention relates to a power supply, and more particularly to a power supply incorporating power factor correction.

Electric power is distributed almost universally in an alternating current (AC) format that allows for efficient transmission. Most devices however, including personal computers, televisions, etc., require direct current (DC) power. Power supplies act to convert the AC input supplied by a line to a DC output suitable for consumption by a device or load. A switched-mode power supply (SMPS) employing a boost regulator is commonly employed in this role of AC-to-DC power conversion. A benefit of employing a SMPS having a boost regulator topology is the boost regulator can be controlled to provide power factor correction.

The term 'power factor' refers to the ratio of real power to apparent power, wherein real power represents the power available to do work within the circuit and apparent power is the product of the current and voltage provided to the circuit. A power factor of 'one' indicates that all apparent power is converted to real power. The power factor is decreased by factors such as phase differences between the input current and voltage as well as non-linearities associated with either the input current or voltage. For example, switched-mode power supplies draw a non-sinusoidal current that decreases the power factor of the device.

To improve the power factor associated with power supplies, such as switched-mode power supplies, a power factor correction (PFC) controller incorporates a current control loop that is based on inputs that typically include the AC input current drawn by the power supply, the AC input voltage provided to the power supply, and the DC output voltage of the power supply, drives the input current to a sinusoidal shape that tracks the AC input voltage, and controls the DC output to a desired value. A number of control loops are well-known in the art for providing active power factor correction to switched-mode power supplies (e.g., continuous current mode controllers, transition mode controllers, etc.). However, many of the problems encountered by active power factor correction controllers are related to how the controller handles fault conditions associated with the switched-mode power supply.

SUMMARY

A controller generates drive signals for an active converter circuit that converts an alternating current (AC) voltage to a direct current (DC) output voltage. The controller includes a pulse width modulator (PWM), an outer feedback loop, and an inner feedback loop. The outer feedback loop monitors the output voltage of the converter circuit and generates in response a voltage feedback signal provided to a first input of the PWM. The inner feedback loop monitors an AC input current drawn by the converter circuit and generates in response a current feedback signal provided to a second input of the PWM. In response to these signals the PWM generates the drive signals provided to control the active converter. In particular, the inner feedback loop includes an amplifier and a fault protection and clamp circuit. The amplifier having a first input connected to receive a feedback signal representing the monitored AC input current, a second input, and an output for generating the current feedback signal provided as an input to the PWM. The fault protection and clamp circuit is connected to monitor the voltage at the second input (i.e., the current feedback signal) of the PWM and to detect fault conditions associated with the converter circuit. In response to an over-voltage condition in the current feedback signal or a detected fault condition the protection circuit clamps the current feedback signal provided to the second input of the PWM to a reference value and provides the reference value in feedback to either the first or second input of the amplifier.

DETAILED DESCRIPTION

The power factor correction (PFC) controller of the present invention provides improved operation and recovery from fault conditions. In particular, an amplifier employed in an inner control loop to provide a reference value representing the difference between a monitored input current and an output of an outer control loop during normal operation is modified to operate in a unity gain mode in response to the reference value exceeding a defined threshold limit (clamp point) or in response to a fault condition. Operating the amplifier in a unity gain mode, in which the output of the amplifier is provided as feedback to one of the inputs, improves the performance of the amplifier (e.g., decreases noise, power consumption, etc.).

Figure 1:
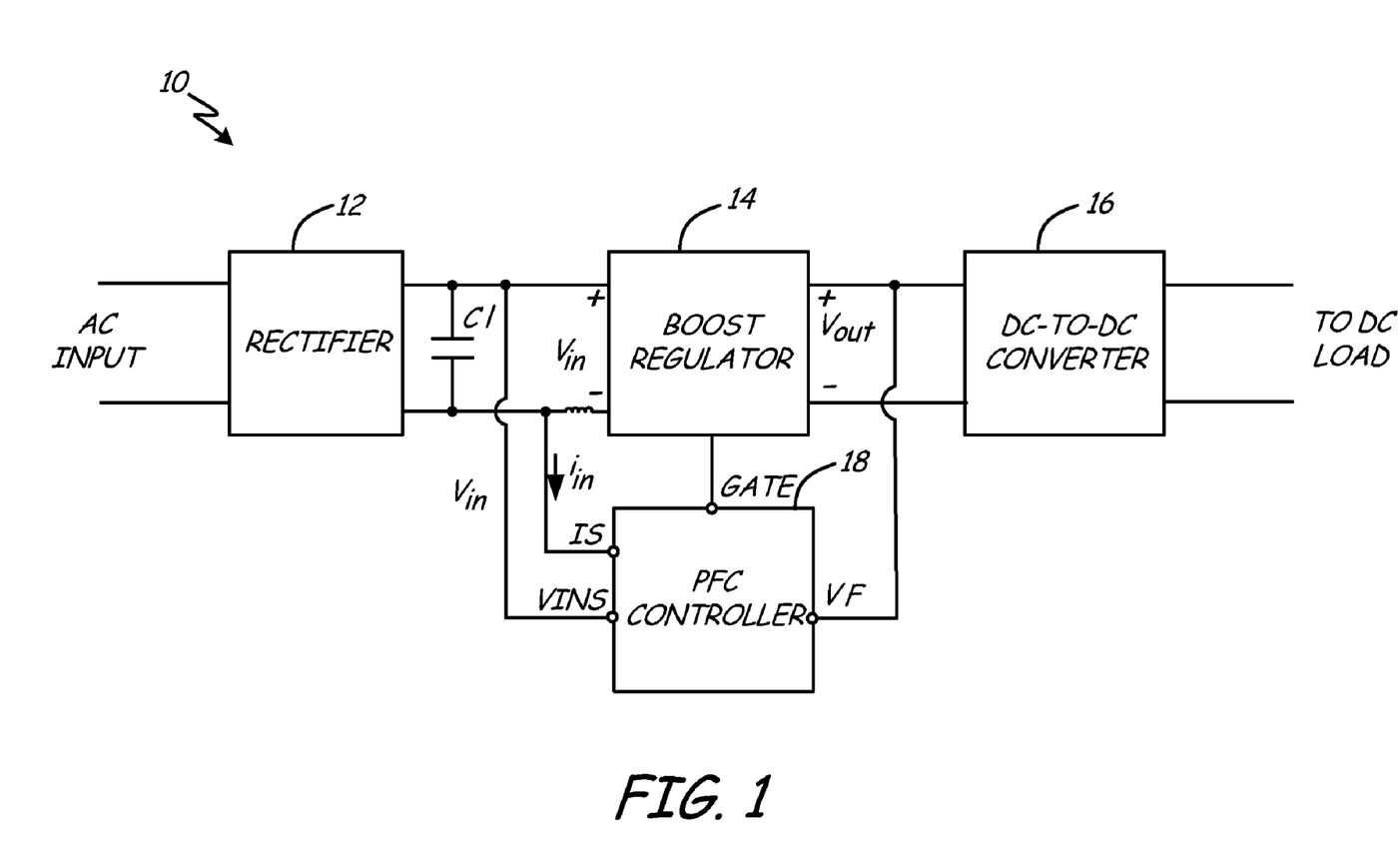
FIG. 1 is a block diagram of a power conversion system and a power factor correction (PFC) controller according to an embodiment of the present invention.

FIG. 1 is a block diagram of switched-mode power supply (SMPS) 10 according to an embodiment of the present invention. SMPS 10 includes rectifier 12, capacitor C1, boost regulator 14, DC-to-DC converter 16, and power factor correction (PFC) controller 18. SMPS 10 is organized in a boost regulation topology in which an AC input is converted to a DC output. Rectifier 12 rectifies the AC input, typically provided at a frequency of 60 Hertz (Hz) (although other applications may employ other frequencies, e.g., 50 Hz or 400 Hz), and provides the rectified output across capacitor C1 to boost regulator 14. Capacitor C1 provides smoothing to the rectified output, but also is the reason for the non-sinusoidal current draw characteristic of switch-mode power supplies without power factor correction. The storage of energy by capacitor C1 results in current being drawn from the AC line only in response to the AC input voltage exceeding the voltage stored by capacitor C1. As a result, SMPS 10 draws a non-linear current, with spikes of current being drawn around the peak of the AC input voltage.

To improve the power factor of the system, boost regulator 14 (employing at least one actively controlled device) is employed between the rectified input (Vin) and a load, the operation of which is controlled by PFC controller 18 to draw a sinusoidal current from the AC line that is in phase with the AC input voltage. In addition, boost regulator 14 generates a DC output voltage (typically having a higher voltage value than the peak AC input voltage) provided to DC-DC converter for conversion to a DC output required by an attached load.

Figure 2:
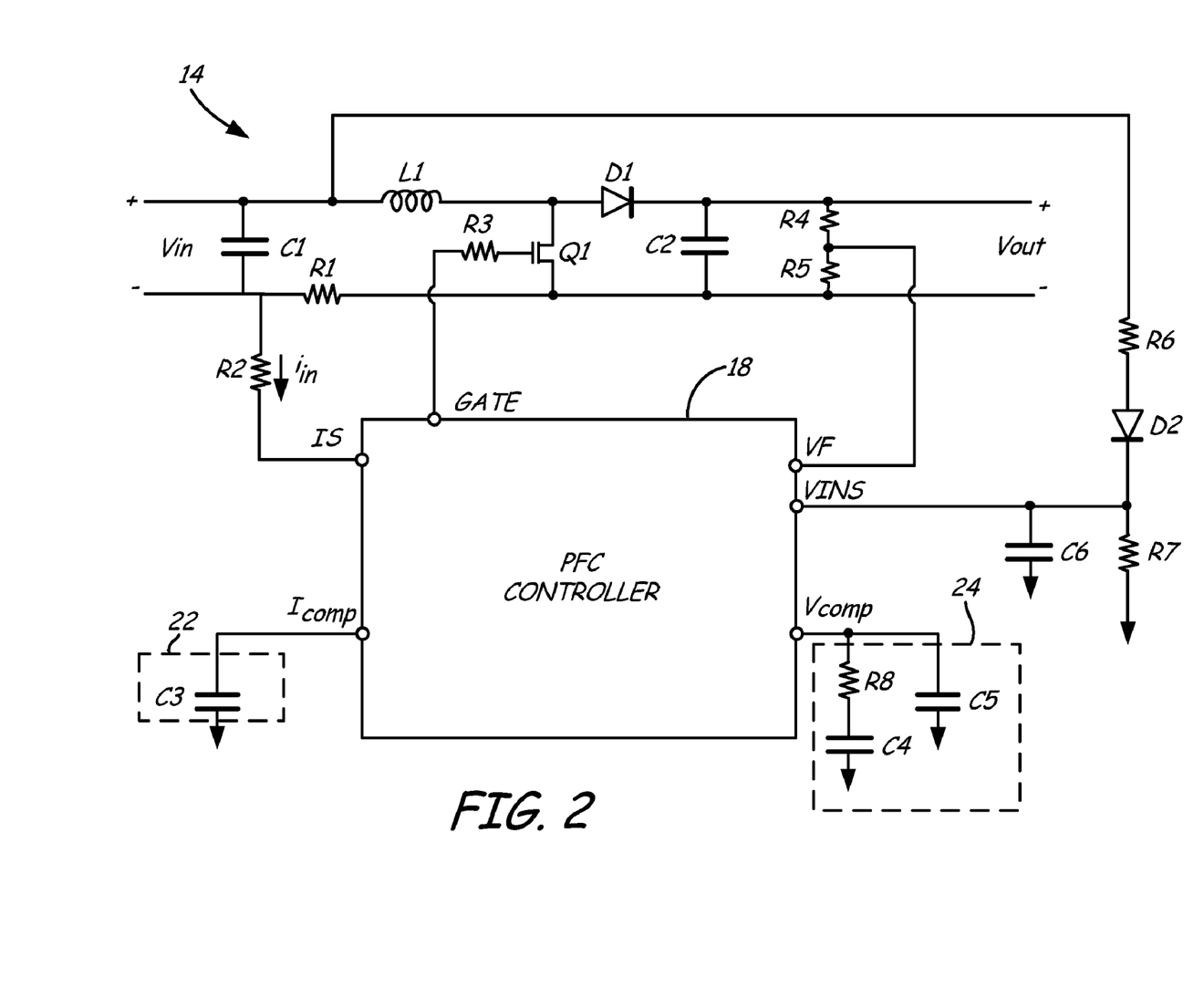
FIG. 2 is a circuit diagram illustrating the connection of the PFC controller to the boost regulator of the power conversion system according to an embodiment of the present invention.

FIG. 2 is a circuit diagram illustrating communication between PFC controller 18 and boost regulator 14 to provide active power factor correction. In the embodiment shown, boost regulator 14 includes boost inductor L1, diodes D1 and D2, capacitors C2, C3, C4, C5 and C6, resistors R1, R2, R3, R4, R5, R6, R7 and R8 and power transistor Q1. The state of transistor Q1 determines the operating mode of boost regulator 14. When transistor Q1 is 'ON' (i.e., conducting), current through inductor L1 increases linearly (at a rate determined by the magnitude of the input voltage), causing energy to be stored to inductor L1. When transistor Q1 is 'OFF' (i.e., non-conducting), current through inductor L1 decreases linearly (again, at a rate determined by the magnitude of the input voltage as well as the magnitude of the DC output voltage) as the energy stored by inductor L1 is provided to charge capacitor C2, thereby increasing the DC output voltage of boost regulator 14. The duty cycle of transistor Q1 (i.e., the percentage of time during each cycle that the transistor is 'ON') is selectively controlled by PFC controller 18.

In particular, the function of PFC controller 18 can be divided into two tasks, control of the DC output voltage and power factor correction. For both tasks, PFC controller 18 employs an inner control loop (sometimes referred to as the current control loop) and an outer control loop (sometimes referred to as the voltage control loop). The outer control loop compares the monitored DC output voltage of boost regulator 14 with a reference value to determine whether additional energy should be transferred from inductor L1 to capacitor C2 (i.e., by decreasing the 'ON time of transistor Q1). The inner loop ensures that the AC input current drawn from the AC main is approximately sinusoidal to provide the desired power factor correction. Because the DC output voltage and AC input current operate at different frequency domains, PFC controller 18 can satisfy both control goals through the selective control of transistor Q1.

In this embodiment, PFC controller 18 includes four connection pins (VF, IS, VINS, and Gate) operably connected to communicate with boost regulator 14. Input pin 'VF' is connected to a voltage divider network defined by resistors R4 and R5 to monitor the DC output voltage of boost regulator 14. Input pin 'IS' is connected to resistor R2 to monitor a voltage representing the rectified input current through inductor L1 (i.e., the current drawn from the AC mains by boost regulator 14). Input pin 'VINS' is connected through a network that includes capacitor C6, resistors R6 and R7 and diode D2, to monitor the rectified input voltage provided by rectifier 12. Output pin 'Gate' provides a pulse width modulation signal to the gate of transistor Q1 to selectively control the operating state of transistor Q1. PFC controller also includes two additional connection pins, labeled 'Icomp' and 'Vcomp'. Both Icomp and Vcomp are connected to filter components that are typically too large to incorporate onto the PFC controller integrated circuit (IC). For instance, the Icomp pin is connected to current filter circuit 22 comprising capacitive storage element C3. Likewise, the 'Vcomp' pin is connected to voltage filter circuit 24 comprising a pair of capacitive storage elements C4 and C5 and resistor R8. In other embodiments, these elements may be incorporated onto the PFC controller IC.

Figure 3A:
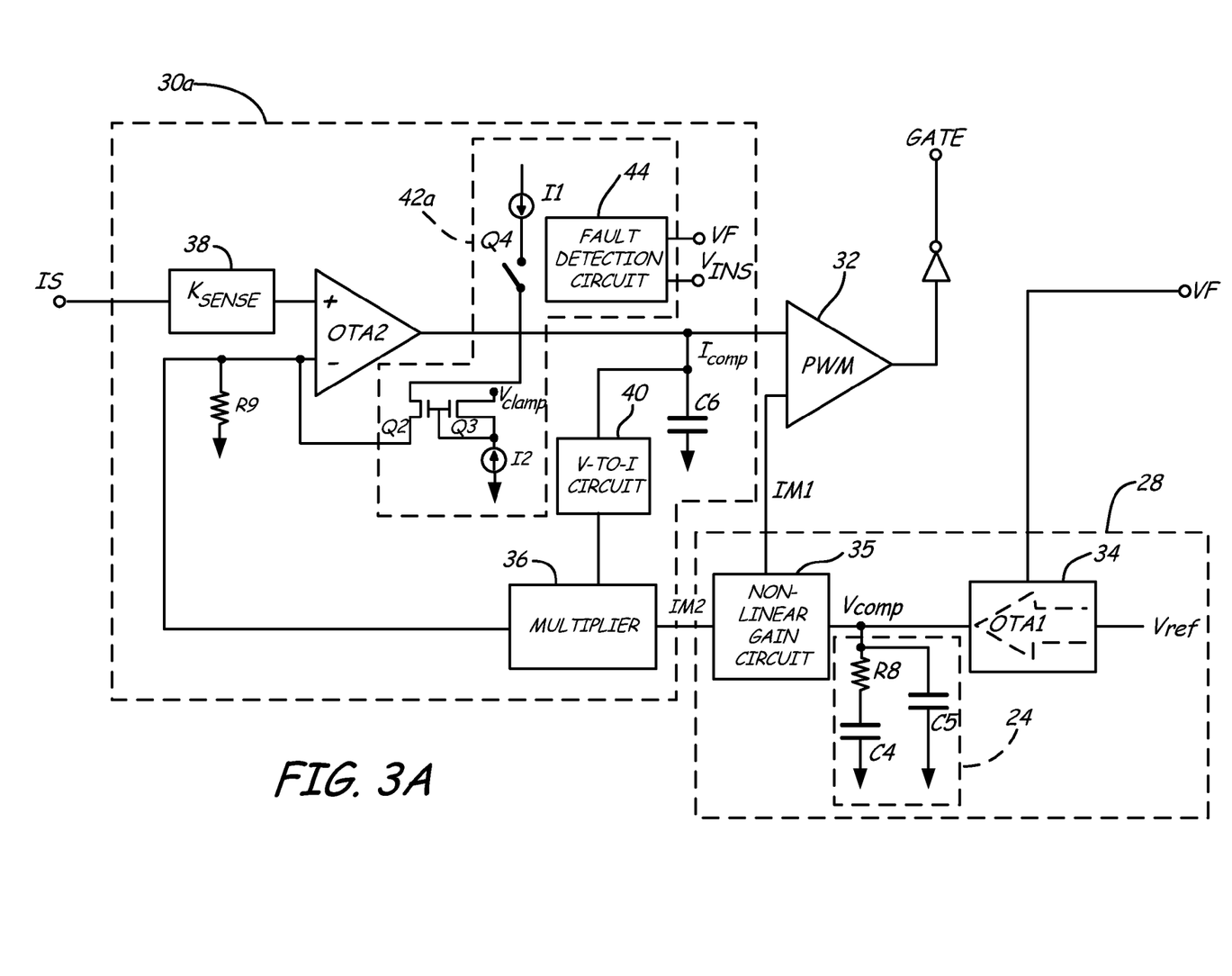
FIG. 3A is a circuit diagram illustrating the operation of PFC controller in providing reference clamping and fault protection according to an embodiment of the present invention.
Figure 3B:
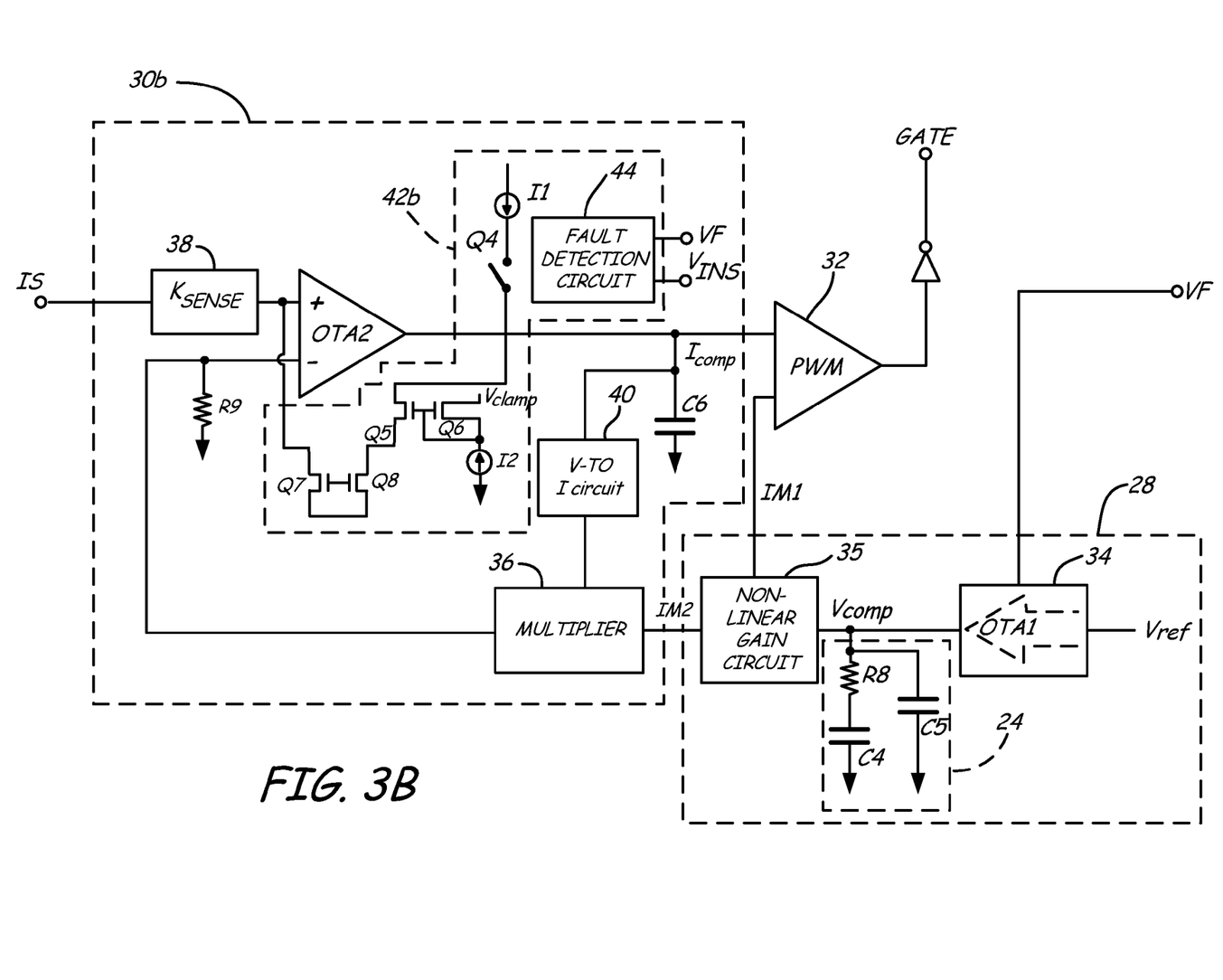
FIG. 3B is a circuit diagram illustrating the operation of PFC controller in providing reference clamping and fault protection according to an embodiment of the present invention.

As discussed in more detail with respect to FIGS. 3A and 3B, the present invention provides for an improved response to fault conditions. For instance, a short-circuit across inductor L1 will result in a corresponding decrease in the DC output voltage. If unchecked, PFC controller 18 will cause transistor Q1 to be turned 'ON' for an excessive period of time, resulting in potential damage to transistor Q1. Likewise, a open circuit condition may result in the monitored DC output increasing. Once again, if unchecked, PFC controller 18 will cause transistor Q1 to be turned 'ON' for an excessive period of time, resulting in potential damage to transistor Q1.

FIG. 3A is a circuit diagram illustrating the operation of PFC controller in providing reference clamping and fault protection according to an embodiment of the present invention.

PFC controller 18 includes outer (voltage) control loop 28, inner (current) control loop 30a and pulse width modulator (PWM) 32. Outer control loop 28 includes comparator 34 and non-linear gain circuit 35. Feedback provided to outer control loop 28 includes a monitored DC output voltage (labeled $V_{out}$ in FIG. 2) provided via pin VF and generates in response a control signal measuring the difference between the DC output voltage and a reference voltage (labeled $V_{ref}$). In this embodiment, comparator 34 includes operational transconductance amplifier OTA1 for comparing the DC output voltage with reference voltage $V_{ref}$ generating an output current that reflects the difference or error between the two voltage inputs. The output of amplifier OTA1 drives voltage filter network 24, although amplifier OTA1 is open-loop stable and therefore needs no compensation. The compensated output of comparator 34 is provided to non-linear gain circuit 35, which generates a first output (labeled 'IM1') that is provided to a first input of PWM 32 and a second output (labeled 'IM2') that is provided as an input to inner control loop 30a. The first output IM1 is typically converted to a voltage signal, having a characteristic saw-tooth shape in which the voltage ramps up at a rate defined by the voltage at node Vcomp. The voltage ramp is compared by PWM 32 to the output of the inner control loop 30a (voltage at node Icomp) to determine whether to turn transistor Q1 (shown in FIG. 2) 'ON' or 'OFF'.

Inner control loop 30a includes multiplier 36, Ksense circuit 38, amplifier OTA2 (e.g., an operational transconductance amplifier in this embodiment), voltage to current (V-to-I) converter 40 and fault protection and clamp circuit 42a, which includes transistors Q2, Q3, and Q4, current sources I1 and I2, and protection circuit 44. In this embodiment, feedback provided to inner control loop 30a includes the output IM2 generated by outer control loop 28 and monitored AC input current at pin IS (as shown in FIG. 2, labeled $i_{in}$). The output of the inner control loop 30a is the voltage at node Icomp, which is provided to the other input of PWM 32. The reference voltage at node Icomp is compared with the saw-tooth ramp voltage provided by outer control loop 28, wherein transistor Q1 (as shown in FIG. 1) is turned 'ON' in response to the ramp voltage exceeding the reference voltage. In this way, current feedback provided by inner control loop 30a ensures that the current drawn by boost regulator 14 follows the input waveform.

During normal operation, feedback provided by outer control loop 28 is combined with internal feedback provided from the Icomp node by multiplier 36. The output of multiplier 36 is provided to the negative input of amplifier OTA2 for comparison with the monitored AC input current sensed at pin IS and provided through Ksense circuit 38 (which scales and offsets the sensed input current) to the positive input of amplifier OTA2. The output of OTA2 is a current signal that reflects the difference in the monitored input current and the feedback provided by voltage loop 28. The current signal generated by amplifier OTA2 is provided to the Icomp pin and filtered by current filter circuit 22. The resulting voltage provided at the Icomp pin, as defined by the current provided to the node and the charging and discharging of capacitor C6, represents the averaged value of the current drawn by inductor L1, and is provided as the second input to PWM 32 for comparison with the voltage ramp signal generated by outer control loop 28.

In response to the inputs provided by inner control loop 30a and voltage control loop 28 (i.e., voltage provided at Icomp and the saw-tooth ramp signal labeled IM1), PWM 32 generates pulse width modulated drive signals that selectively control the operating state of transistor Q1. As discussed above, each cycle begins with transistor Q1 being turned 'OFF' (thereby transferring energy from inductor L1 to capacitor C2). When the ramp signal provided by inner control loop 28 reaches the threshold defined by outer control loop 30, transistor Q1 is turned 'ON' for the remainder of the cycle (thereby causing current to be drawn from the AC mains and stored in inductor L1).

Fault protection and clamp circuit 42a modifies the operation of inner control loop 30a in response to either an overvoltage condition at the Icomp pin or a fault condition detected by fault detection circuit 44. Voltage clamping ensures that the voltage provided at the Icomp pin does not exceed a particular clamp point. Without voltage clamping, the Icomp voltage may increase to a value substantially higher than that attainable by the voltage ramp signal. As a result, transistor Q1 remains in an 'OFF' state such that the AC input voltage to boost regulator 14 (shown in FIG. 2) is provided directly to the DC output of boost regulator 14, without the benefit of a power boost (i.e., it operates like a peak detect circuit in which power is transferred only when Vout is less than Vin). This results in a forfeiture of control of boost regulator 14 by PFC controller 18, and will cause a decrease in the power factor associated with the power supply. The clamp point is selected to ensure that the voltage ramp signal will cross the threshold during each cycle, resulting in at least a nominal 'ON' time of transistor Q1.

Fault protection ensures that the voltage provided at the Icomp pin is constrained to insure a soft restart of PFC controller 18 following a fault condition. In a fault mode (i.e., short-circuit, sudden loss of load, etc.), the Icomp voltage may decrease to a very low value, based on the voltage loop and the feedback voltage provided. As a result, during restart the voltage ramp signal provided at the first input of PWM 32 may exceed the threshold early in each clock cycle, resulting in transistor Q1 being maintained in an 'ON' state indefinitely. Constraining the voltage at the Icomp pin to always exceed a minimum threshold prevents PFC controller 18 from keeping transistor Q1 'ON' for a time that would cause damage during restart.

Both voltage clamping and fault protection are provided by the same circuitry, and the response to both detected overvoltage of the Icomp voltage and a fault condition is the same. In both cases, the voltage at the Icomp node is driven to a reference value and the reference value is connected in feedback to one of the inputs of amplifier OTA2, causing the amplifier to operate in a unity-gain mode. In voltage clamping, the Icomp node is typically restrained at the reference value (i.e., clamp point) and in fault detection the Icomp node is typically pulled-up to the reference value (i.e., clamp point).

Voltage Clamping

Voltage clamping is provided by transistors Q2 and Q3, connected in a current mirror configuration in which the source of transistor Q2 is connected to the output of amplifier OTA2 and the source of transistor Q3 is connected to a reference voltage Vclamp that represents the desired clamp point. In response to the Icomp node voltage approaching the clamp point, the current mirror is activated (i.e., turned 'ON') such that the current provided by current source I2 provided to the drain of transistor Q3 is mirrored through transistor Q2. As a result of equal currents flowing through each transistor, the reference voltage applied to the source of transistor Q3 is mirrored onto the output of amplifier OTA2. In this way, transistor Q2 behaves as a switch during the clamping operation, in which the voltage at node Icomp is clamped at the voltage defined by the reference voltage Vclamp. In addition, the output of amplifier OTA2 is connected through transistor Q2 (now conducting) to the negative input of amplifier OTA2. Connecting the output of amplifier OTA2 to one of the inputs of amplifier OTA2 results in the amplifier operating in a unity-gain mode. As discussed in more detail with respect to FIGS. 4A-7C, operating amplifier OTA2 in a unity gain mode during voltage clamps provides improved noise performance, reduced current consumption, and reduced strain on amplifier OTA2.

Fault Protection

In addition to providing clamping of the ICOMP voltage, protection circuit 42a, transistor Q4 and current source I1 are employed in conjunction with transistors Q2 and Q3 to provide fault protection to PFC controller 18. In this embodiment, protection circuit 40 detects fault conditions based on the monitored DC output voltage (via pin VF) and the monitored AC input voltage (via pin VINS). For instance, an increase in the DC output voltage beyond a threshold value may indicate an open circuit condition or the sudden loss of a load. Likewise, a sudden drop in the DC output voltage may indicate a short-circuit condition that is typically accompanied by potentially damaging increases in current or a problem with feedback resistors R4, R5. Increases or decreases of the monitored AC input voltage beyond defined threshold values may also be indicative of a fault condition. In other embodiments, additional inputs may be monitored or methods employed to detect a fault condition.

In response to a detected fault condition (regardless of the fault detected), protection circuit 42a generates a fault detected signal that turns transistor Q4 'ON', thereby connecting current source I1 to the source of transistor Q2. The current mirror comprising transistors Q2 and Q3 is activated in response, and the current (defined by current source I1) provided to transistor Q2 is mirrored through transistor Q3. As a result, transistor Q2 operates as a switch that clamps (or pulls up) the output of amplifier OTA2 to the clamping voltage Vclamp (depending on the voltage at Icomp when the fault condition is detected). Typically, a fault condition results in the voltage at Icomp being driven low. In this case, the reference voltage provided by the current mirror causes the voltage at Icomp to be pulled up to the value defined by the reference voltage Vclamp.

In addition, the output of amplifier OTA2 is connected through transistor Q2 (now conducting) to the negative input of amplifier OTA2. Connecting the output of amplifier OTA2 to one of the inputs of amplifier OTA2 results in the amplifier once again operating in a unity-gain mode. As discussed in more detail with respect to FIGS. 4A-7C, operating amplifier OTA2 in a unity gain mode during a fault condition provides improved noise performance, reduced current consumption, and reduced strain on amplifier OTA2.

In response to detection circuit 44 determining that the fault condition has ended, transistor Q2 is turned 'OFF' and the output of amplifier OTA2 is allowed to float based on the inputs to the amplifier. A benefit of operating amplifier OTA2 in unity gain mode is following a fault condition and/or clamping condition, amplifier OTA2 is able to recover or return more efficiently to a normal operating mode. In particular, because at least one of the inputs is maintained at the reference voltage Vclamp during a fault or clamping operation, amplifier OTA2 is well-positioned to make a return to normal operation without large changes in the input that would require sudden surges in output current that may slow the recovery of amplifier OTA2.

FIG. 3B is a circuit diagram illustrating the operation of PFC controller 18b in providing fault protection and clamping according to an embodiment of the present invention. The embodiment shown in FIG. 3B is similar to the embodiment described with respect to FIG. 3A, except the feedback provided to amplifier OTA2 during fault protection or clamping is provided to the positive input of amplifier OTA2. PFC controller 18b once again includes outer (voltage) control loop 28, inner (current) control loop 30b and PWM 32. Outer control loop 28 includes comparator 34, voltage filter network 24, and non-linear gain circuit 35. Feedback provided to outer control loop 28 includes the DC output voltage monitored at pin VF and a reference voltage Vref to which the monitored DC output voltage is compared by comparator 34. Outer control loop 28 generates a voltage ramp output that is provided to a first input of PWM 32 and a voltage feedback that is provided as an input to inner control loop 30b.

Inner control loop 30b includes multiplier 36, Ksense circuit 38, operational transconductance amplifier OTA2, voltage to current (V-to-I) converter 40 and fault detection and clamping circuit 42b, which includes fault detection circuit 44, transistors Q4, Q5, Q6, Q7 and Q8, and current sources I1 and I2. Feedback provided to inner control loop 30b includes the voltage feedback provided by outer feedback loop 28 and the AC input current monitored at pin IS. The output of inner feedback lop 30b, referred to by the pin Icomp to which it is connected, is provided as a second input to PWM 32. In particular, when the ramp voltage provided by outer control loop 28 exceeds a threshold value determined by inner control loop 30b, PWM 32 generates a signal causing transistor Q1 (shown in FIG. 2) to turn 'ON'. Each duty cycle is therefore defined by an 'OFF' time in which the ramp voltage is less than the threshold value and an 'ON' time that occupies the remainder of the duty cycle following the ramp voltage exceeding the threshold value.

The output of current loop 30b, at the node designated Icomp, is provided as feedback through V-to-I converter 40 to convert the Icomp node voltage to a representative current provided to multiplier 36 (in this case, a current-mode multiplier). The output of multiplier 36 is provided as feedback to the negative input of amplifier OTA2. The monitored AC input current, provided at pin IS, is provided through Ksense circuit 38 to the positive input of amplifier OTA2, which provides the output that is provided to PWM 32.

Unlike the embodiment shown in FIG. 3A, in this embodiment fault protection and clamping circuit 42b provides the clamp voltage Vclamp to the positive input of amplifier OTA2 (as well as the output of amplifier OTA2). During a clamp or fault condition, amplifier OTA2 is operated in a negative feedback mode, rather than a unity gain mode.

Transistors Q5 and Q6 are connected in the same arrangement as that discussed with respect to transistors Q2 and Q3, respectively, described in FIG. 3A. In this embodiment, additional transistors Q7 and Q8 are included in the feedback loop provided to the positive input of amplifier OTA 2, forming a second current mirror that, when activated, provides the reference voltage Vclamp to the positive input of amplifier OTA2.

Voltage Clamping

In response to the voltage on the Icomp pin approaching the threshold voltage value determined by reference voltage Vclamp, the current mirror defined by transistors Q5 and Q6 is activated to mirror the reference voltage Vclamp onto the Icomp pin. With transistor Q6 conducting, the reference voltage Vclamp is provided to the current mirror comprised of transistors Q7 and Q8, which causes the reference voltage Vclamp to be mirrored onto the positive input of amplifier OTA2. With both the output of amplifier OTA2 (i.e., the Icomp pin) and the positive input of OTA2 clamped at the reference voltage Vclamp, amplifier OTA2 operates in a negative-feedback mode until the negative input provided to amplifier OTA2 returns to a value that results in a decrease of the output of amplifier OTA2. At that time, transistor Q6 turns 'OFF' and the reference voltage Vclamp is removed both from the output of amplifier OTA2 and the positive input of amplifier OTA2.

Fault Protection

Detection of a fault condition by fault detection circuit 44 provides a similar response. Once again, fault detection circuit 44 monitors the DC output voltage (monitored at pin VF) and the AC input voltage (monitored at pin VINS). In response to a detected fault, detection circuit 44 generates a fault detected signal that turns 'ON' transistor Q4, thereby connecting current source I1 to the source of transistor Q5. The current mirror defined by transistors Q5 and Q6, as well as the current mirror defined by transistors Q7 and Q8 causes the output voltage of amplifier OTA2 to be clamped or pulled-up (depending on the voltage at node Icomp at the time of the fault) to the value of reference voltage Vclamp. In addition, the reference voltage is mirrored onto the positive input of amplifier OTA2 to operate the amplifier in a negative-feedback mode. In response to detection circuit 44 determining that the fault condition has ended, transistor Q4 is turned 'OFF' and the output of amplifier OTA2 is allowed to float based on the inputs to the amplifier. A benefit of operating amplifier OTA2 in negative-feedback mode is that following a fault condition and/or clamping condition, amplifier OTA2 is able to recover or return more efficiently to a normal operating mode. In particular, because at least one of the inputs is maintained at the reference voltage Vclamp during a fault or clamping operation, amplifier OTA2 is well-positioned to make a return to normal operation without large changes in the input that would require sudden surges in output current that may slow the recovery of amplifier OTA2.

FIGS. 4A-7C are waveform diagrams illustrating the effect the fault protection and clamp circuit (in particular, the embodiments described with respect to FIGS. 3A and 3B) has on the operation of operational transconductance amplifier OTA2.

Figure 4A:
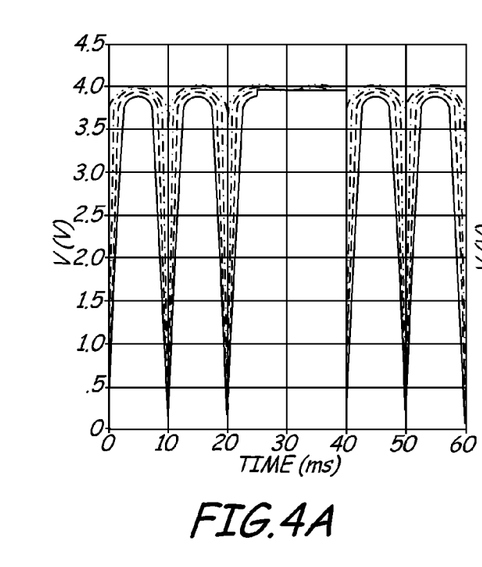
FIGS. 4A-4C are waveform charts illustrating the operation of the PFC controller in providing reference clamping and fault protection according to an embodiment of the present invention described with respect to FIG. 3A.
Figure 4B:
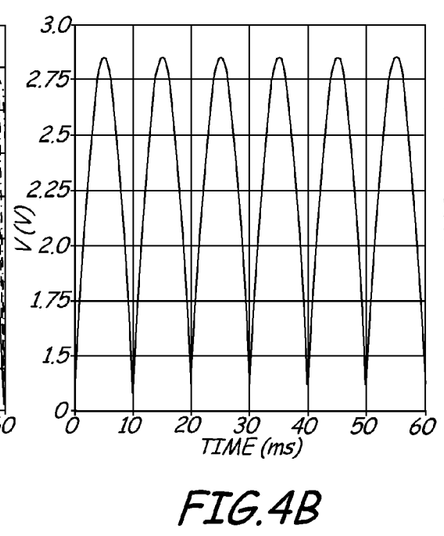
Figure 4C:
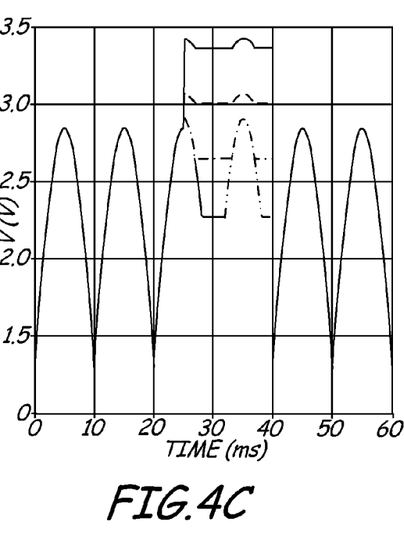

FIGS. 4A-4C illustrate the embodiment described with respect to FIG. 3A, in which the output of amplifier OTA2 is connected to the negative input of amplifier OTA2.

Figure 5A:
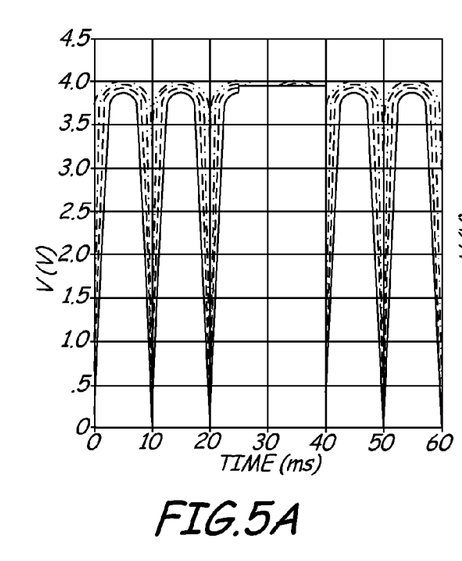
FIGS. 5A-5C are waveform charts illustrating the operation of the PFC controller in providing reference clamping and fault protection according to an embodiment of the present invention described with respect to FIG. 3B.
Figure 5B:
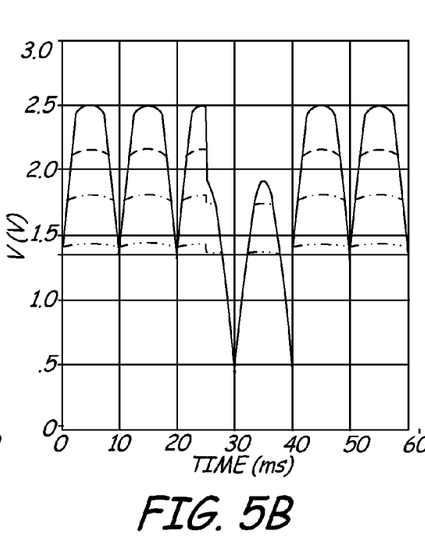
Figure 5C:
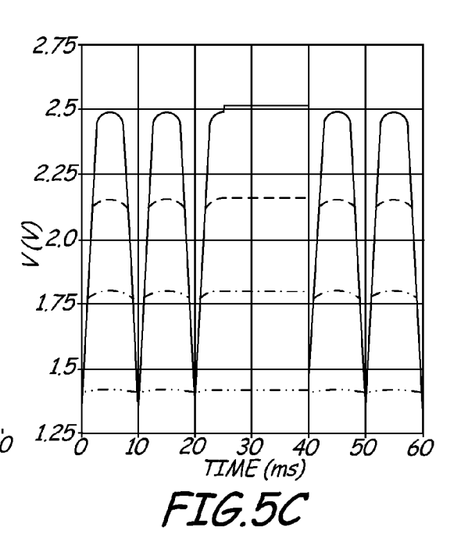

FIGS. 5A-5C illustrate the embodiment described with respect to FIG. 3B, in which the output of amplifier OTA2 is connected to the positive input of amplifier OTA2.

Figure 6A:
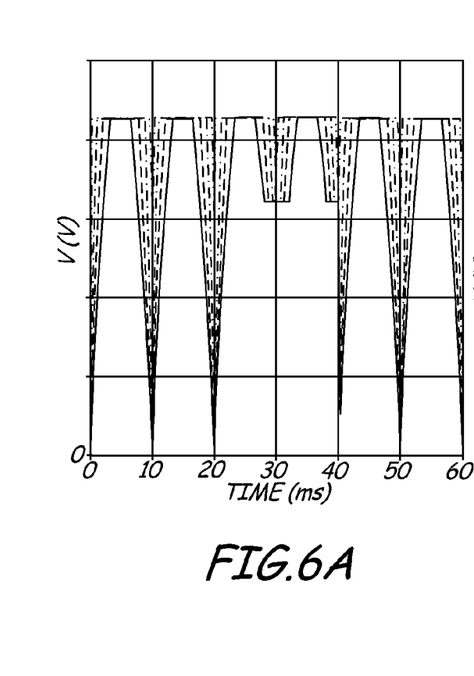
FIGS. 6A-6C are waveform charts illustrating the operation of a prior art PFC controller in providing reference clamping and fault protection.
Figure 6B:
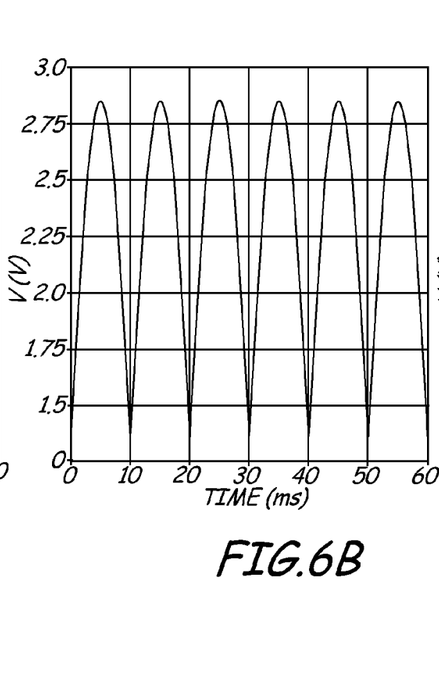
Figure 6C:
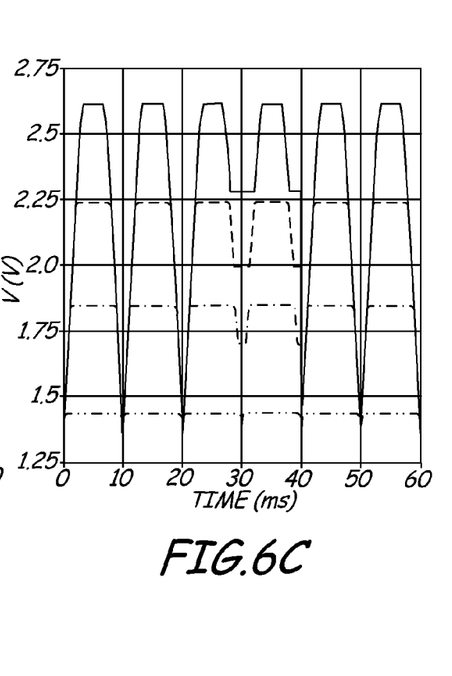

FIGS. 6A-6C illustrate a prior art system in which no feedback is provided to either input of amplifier OTA2.

Figure 7A:
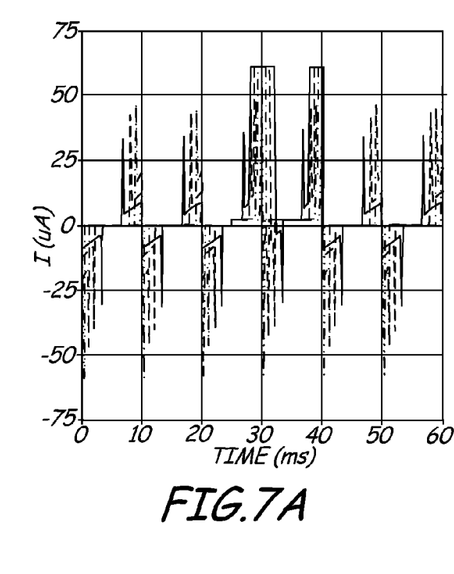
FIGS. 7A-7C are waveform charts illustrating advantages of the present invention as compared with the prior art.
Figure 7B:
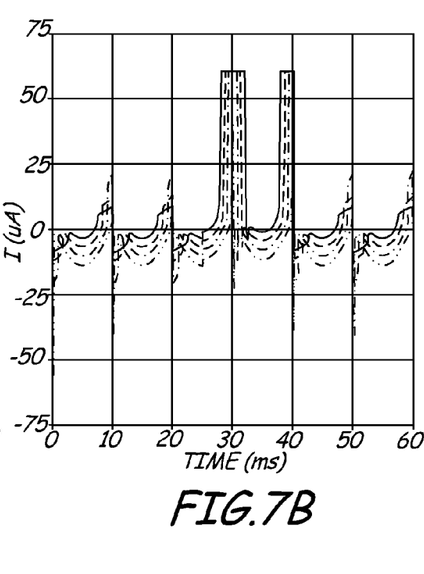
Figure 7C:
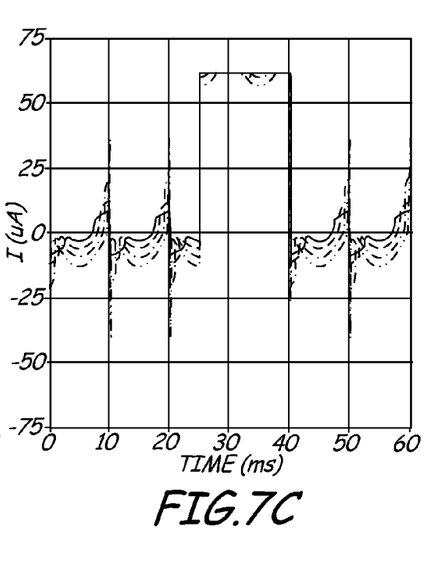

FIGS. 7A-7C compare the current noise associated with operational transconductance amplifier OTA2 as described according to embodiments of the present invention with the prior art system described with respect to FIGS. 6A-6C.

Each waveform diagram is a representation of the same simulation, the differences in each waveform highlighting how various embodiments of the fault protection and clamping circuit affect the operation of operational transconductance amplifier OTA2. In particular, each waveform represents a different magnitude of the voltage feedback IM1. Starting at time 0 (zero) milliseconds (ms) to 25 ms and 40 ms to 60 ms, the circuit is operating in a non-fault mode in which the output of amplifier OTA2 periodically attempts to exceed the reference voltage Vclamp (e.g., 5 ms, 15, ms, 45 ms, and 55 ms), thereby illustrating the voltage clamping operation provided by each circuit. At 25 ms, a fault condition is detected that results in transistor Q4 being turned 'ON' (as shown in FIGS. 3A and 3B), and persists until 40 ms, at which time transistor Q4 is turned 'OFF'. In each of these embodiments, the reference voltage Vclamp is set to four volts.

FIGS. 4A-4C illustrates the embodiment described with respect to FIG. 3A, in which the output of amplifier OTA2 is connected to the negative input of amplifier OTA2. In particular, FIG. 4A illustrates the voltage at the Icomp node given a plurality of feedback signals (described as current values) provided by outer control loop 28. FIG. 4B illustrates the voltage provided at the positive input of amplifier OTA2, which is dependent on the monitored AC input current detected at pin IS. FIG. 4C illustrates the voltage provided at the negative input of amplifier OTA2, which is dependent on the input provided by multiplier 36 and the feedback provided by fault protection and clamp circuit 42a.

During normal operation, the Icomp node voltage (FIG. 4A) oscillates as a rectified sine wave based on the inputs (both oscillating as rectified sine waves) provided at the positive input (FIG. 4B) and negative input (FIG. 4C) of amplifier OTA2. However, as shown at the peak of each oscillation, the Icomp voltage is successfully clamped below the reference voltage Vclamp (e.g., 4 V). In addition, the positive input of amplifier OTA2 (FIG. 4B), which represents the input current drawn by boost regulator 14, has a sinusoidal shape desired for proper power factor correction (i.e., the amplitude of the current waveform follows the amplitude of the voltage waveform).

During a detected fault condition (e.g., 25 ms-40 ms), transistor Q4 (as shown in FIG. 3A) is turned 'ON', resulting in the Icomp node voltage (FIG. 4A) being successfully pulled up to four volts (V). The positive input of amplifier OTA2 (FIG. 4B) is unaffected by the fault condition, and continues to represent the rectified AC input current. The negative input of amplifier OTA2 (FIG. 4C) is connected through transistor Q2 to the output of amplifier OTA2, and during the fault condition is pulled up to varying degrees depending on the output IM1 provided by the outer control loop. The effect of connecting the output of amplifier OTA2 to the negative input of amplifier OTA2 is described in more detail with respect to FIGS. 7A-7C.

FIGS. 5A-5C illustrates the embodiment described with respect to FIG. 3B, in which the output of amplifier OTA2 is connected to the positive input of amplifier OTA2. In particular, FIG. 5A illustrates the voltage at the Icomp node given a plurality of feedback signals (described as current values) provided by outer control loop 28. FIG. 5B illustrates the voltage provided at the positive input of amplifier OTA2, which is dependent on the monitored AC input current detected at pin IS and the feedback provided by clamping and protection circuit 42b. FIG. 5C illustrates the voltage provided at the negative input of amplifier OTA2.

During normal operation, the Icomp node voltage (FIG. 5A) oscillates as a rectified sine wave based on the inputs (both oscillating as rectified sine waves) provided at the positive input (FIG. 5B) and negative input (FIG. 5C) of amplifier OTA2. However, as shown at the peak of each oscillation, the Icomp voltage is successfully clamped below the reference voltage Vclamp (e.g., 4 V). In addition, the positive input of amplifier OTA2 (FIG. 5B), which represents the input current drawn by boost regulator 14, has a sinusoidal shape (i.e., the amplitude of the current waveform follows the amplitude of the voltage waveform), distorted slightly by the feedback provided by clamping and protection circuit 42a near the peaks of each oscillation. A comparison of FIG. 4B with FIG. 5B illustrates the presence of feedback provided to the positive input of amplifier OTA2 in response to the output attempting to exceed the reference voltage Vclamp.

During a detected fault condition (e.g., 25 ms-40 ms), transistor Q4 (as shown in FIG. 3B) is turned 'ON', resulting in the current mirror applying the reference voltage Vclamp to both the Icomp node and to the positive input of amplifier OTA2 (FIG. 5A). FIG. 5A illustrates the Icomp node voltage being pulled up to the reference voltage Vclamp during the detected fault condition. FIG. 5B illustrates the effect of connecting the reference voltage Vclamp in feedback to the positive input of amplifier OTA2. In addition, in the embodiment shown in FIG. 3B, additional feedback is provided to the negative input of amplifier OTA as a result of the feedback provided by the Icomp node through multiplier 36 (as shown in FIG. 3B). As a result, the negative input to amplifier OTA2 is also modified as a result of the fault condition, although not as a result of direct feedback. The effect of connecting the output of amplifier OTA2 to the positive input of amplifier OTA2 is described in more detail with respect to FIGS. 7A-7C.

FIGS. 6A-6C are waveforms representing a prior art method of providing clamping and fault protection to a PFC controller. In particular, these waveforms are based on the assumption that a reference voltage (e.g., 4 volts) is connected to the output of the operational transconductance amplifier, but without any feedback provided to the input of the amplifier. FIG. 6A illustrates the voltage at node Icomp, connected to the output of the amplifier. As shown, the output is successfully clamped at approximately four volts during normal operation, and pulled up to a value of approximately 3.2 volts during a fault condition. Therefore, one difference between the present invention and the prior art is that the prior art results in a difference between the voltage at Icomp during clamping operations and during fault conditions. As shown in FIG. 6B, the positive input of the amplifier is unaffected by either clamping operations or fault conditions. As shown in FIG. 6C, the negative input of the amplifier is modified slightly by feedback provided from the Icomp node through the multiplier to the negative input of the amplifier.

FIGS. 7A-7C illustrate the current provided at the output of the operational transconductance amplifier. FIG. 7A illustrates the current provided by the prior art system, FIG. 7B illustrates the current provided by the embodiment described with respect to FIG. 3A in which the output of amplifier OTA2 is provided in feedback to the negative input of amplifier OTA2, and FIG. 7C illustrates the current provided by the embodiment described with respect to FIG. 3B in which the output of amplifier OTA2 is provided in feedback to the positive input of amplifier OTA2.

The prior art method results in a substantially noisier output (i.e., both more spikes of current on the output of the OTA and higher magnitude spikes of current) during both normal operating conditions and during fault conditions. For instance, during normal operating conditions the prior art results in current spikes greater than 50 micro-amperes (μA) on the output of the amplifier, while both embodiments of the present invention (FIGS. 7B and 7C) maintain the output current of the operational amplifier at approximately 25 μA. In addition, the present invention reduces the noise associated with the output current during normal operating conditions, providing substantially smoother waveforms than are shown in FIG. 7A.

During fault conditions, the prior art method again results in a substantially noisier output than that provided by either of the embodiments associated with the present invention. In particular, the embodiment in which feedback is provided to the positive input of amplifier OTA2 (FIG. 7C) results in a substantially noiseless output. The embodiment in which feedback is provided to the negative input of amplifier OTA2, as compared with the prior art, also provides a reduction in noise on the output current.

Although the present invention has been described with reference to preferred embodiments, workers skilled in the art will recognize that changes may be made in form and detail without departing from the spirit and scope of the invention. In particular, embodiments of the present invention have been described with respect to specific types of circuits and devices, such as metal-oxide semiconductor field-effect transistors (MOSFETs), although a number of other well-known circuits and devices capable of performing the desired function may be used in place of described circuits.

The invention claimed is:

1. A controller operably connected to generate a drive signal for a converter circuit that converts a rectified alternating current (AC) input voltage to a direct current (DC) output voltage, the controller comprising:
   a pulse width modulator (PWM) connected to generate the drive signal based on a voltage feedback signal and a current feedback signal;
   an outer feedback loop that monitors the output voltage of the converter circuit and generates in response the voltage feedback signal provided to a first input of the PWM; and
   an inner feedback loop that monitors an AC input current drawn by the converter circuit and generates in response the current feedback signal provided to a second input of the PWM, the inner feedback loop comprising:
      an amplifier having a first input connected to receive a feedback signal representing the monitored AC input current, a second input, and an output; and
      a fault protection and clamp circuit connected to monitor the current feedback signal provided to the second input of the PWM and to detect fault conditions associated with the converter circuit, wherein in response to an over-voltage condition in the current feedback signal or a detected fault condition the fault protection and clamp circuit clamps the current feedback signal provided to the second input of the PWM to a reference value and provides the reference value in feedback to the amplifier.

2. The controller of claim 1, wherein the fault protection and clamp circuit provides the reference voltage in feedback to the first input of the amplifier.

3. The controller of claim 1, wherein the fault protection and clamp circuit provides the reference voltage in feedback to the second input of the amplifier.

4. The controller of claim 1, wherein the fault protection and clamp circuit further includes:
   a current mirror circuit having a first transistor connected between a first current source and the reference voltage and a second transistor connected to the output of the amplifier and at least one of the inputs of the amplifier, wherein in response to the voltage at the second input approaching the value of the reference voltage the current mirror is activated and the reference voltage is mirrored onto the output of the amplifier and the at least one input of the amplifier, resulting in the current feedback signal being clamped at the reference voltage and causing the amplifier to operate in a unity gain mode.

5. The controller of claim 4, wherein the fault protection and clamp circuit further includes:
   a fault detection circuit connected to monitor the DC output voltage and to detect based on this input a fault condition; and
   a switch activated in response to a detected fault to connect a second current source to the second transistor of the current mirror, wherein in response to the second current source the current mirror is activated and the reference voltage is mirrored onto the output of the amplifier and the at least one input of the amplifier, resulting in the voltage at the second input being pulled-up to the reference.

6. The controller of claim 4, wherein the fault protection and clamp circuit includes:
   a fault detection circuit connected to monitor the AC input voltage of the converter circuit and to generate a fault detection signal in response to the monitored AC input voltage exceeding a minimum or maximum threshold value; and
   a switch activated in response to the fault detection signal to connect a second current source to the second transistor of the current mirror to activate the current mirror and mirror the reference voltage onto the output of the amplifier and the at least one input of the amplifier, resulting in the voltage at the second input being pulled-up to the reference voltage.

7. The controller of claim 1, wherein the amplifier is an operational transconductance amplifier.

8. The controller of claim 1, wherein the second input to the amplifier is based on feedback that includes the current reference signal provided at the output of the amplifier and a voltage feedback signal provided by the outer feedback loop.

9. The controller of claim 1, wherein the inner feedback loop further includes a filter circuit connected to the output of the amplifier to average the current feedback signal provided to the second input of the PWM.

10. A controller operably connected to generate a drive signal for a converter circuit that converts a rectified alternating current (AC) input voltage to a direct current (DC) output voltage, the controller comprising:
   a pulse width modulator (PWM) connected to generate the drive signal based on a voltage ramp signal and a current reference signal;
   an outer feedback loop that monitors the output voltage of the converter circuit and generates in response the voltage ramp signal provided to a first input of the PWM; and
   an inner feedback loop that monitors an AC input current drawn by the converter circuit and generates in response the current reference signal provided to a second input of the PWM for comparison with the voltage ramp signal, the inner feedback loop comprising:

an amplifier having a first input connected to receive a feedback signal representing the monitored AC input current, a second input, and an output;

a clamp circuit operably connected to the output of the amplifier and at least one input of the amplifier, wherein the clamp circuit monitors the voltage at the second input of the PWM and in response to the monitored voltage exceeding a reference voltage clamps the voltage at the second input to the reference voltage, wherein the clamp circuit further provided the reference voltage in feedback to at least one input of the amplifier.

11. The controller of claim 10, wherein the clamp circuit includes:

a current mirror circuit having a first transistor connected to a first current source and a reference voltage and a second transistor connected to the output of the amplifier and at least one of the inputs of the amplifier, wherein in response to the voltage at the second input approaching the value of the reference voltage the current mirror is activated and the reference voltage is mirrored onto the output of the amplifier and the at least one input of the amplifier, resulting in the voltage at the second input being clamped at the reference voltage.

12. The controller of claim 11, wherein the clamp circuit is connected to a negative input of the amplifier.

13. The controller of claim 11, wherein the clamp circuit is connected to a positive input of the amplifier.

14. The controller of claim 11, wherein further including:

a fault detection circuit connected to monitor the DC output voltage and/or the AC input voltage and to generate a fault detection signal in response to a detected fault condition; and a switch activated in response to the fault detection signal to connect a second current source to the second transistor of the current mirror to activate the current mirror and mirror the reference voltage onto the output of the amplifier and the at least one input of the amplifier, resulting in the voltage at the second input being pulled-up to the reference voltage.

15. A controller operably connected to generate a drive signal for a converter circuit that converts a rectified alternating current (AC) input voltage to a direct current (DC) output voltage, the controller comprising:

a pulse width modulator (PWM) connected to generate the drive signal based on voltage and current feedback;

an outer feedback loop that monitors the output voltage of the converter circuit and generates in response a voltage ramping signal provided to a first input of the PWM; and an inner feedback loop that monitors an AC input current drawn by the converter circuit and generates in response a current reference signal provided to a second input of the PWM for comparison with the voltage ramping signal, the current feedback loop comprising:

an amplifier having a first input connected to receive a feedback signal representing the monitored AC input current, a second input for determining a gain associated with the amplifier, and an output; and a fault detection circuit connected to monitor the DC output voltage and/or the AC input voltage and to detect based on these inputs a fault condition, wherein in response to a detected fault condition the fault detection circuit causes the current feedback signal provided to the second input of the PWM to be pulled up to a reference voltage and applies the reference voltage in feedback to either the first input or the second input of the amplifier.

16. The controller of claim 15, wherein the fault detection circuit includes:

a current mirror circuit having a first transistor connected to a reference voltage and a second transistor connected to the output of the amplifier and at least one of the inputs of the amplifier, wherein in response to a detected fault condition the current mirror is activated and the reference voltage is mirrored onto the output of the amplifier and the at least one input of the amplifier, resulting in the current feedback signal provided to the second input of the PWM being pulled up to the reference voltage.

17. The controller of claim 15, wherein the current mirror circuit is connected to mirror the reference voltage onto a negative input of the amplifier.

18. The controller of claim 15, wherein the current mirror circuit is connected to mirror the reference voltage onto a positive input of the amplifier.

* * * * *